(12) United States Patent
Tan et al.

(10) Patent No.: US 11,204,003 B2
(45) Date of Patent: Dec. 21, 2021

(54) PRESSURE STABILIZER, A GAS ENGINE SYSTEM AND A GAS PRESSURE CONTROL METHOD

(71) Applicant: Weichai Power Co., Ltd., Shandong (CN)

(72) Inventors: Xuguang Tan, Shandong (CN); Wang Li, Shandong (CN)

(73) Assignee: Weichai Power Co., Ltd., Shandong (CN)

( * ) Notice: Subject to any disclaimer, the term of this patent is extended or adjusted under 35 U.S.C. 154(b) by 0 days.

(21) Appl. No.: 17/003,144

(22) Filed: Aug. 26, 2020

(65) Prior Publication Data

US 2021/0156341 A1 May 27, 2021

(30) Foreign Application Priority Data

Nov. 22, 2019 (CN) .......................... 201911152554.2

(51) Int. Cl.
*F02M 21/02* (2006.01)
*F02D 19/02* (2006.01)

(52) U.S. Cl.
CPC ....... *F02M 21/0239* (2013.01); *F02D 19/022* (2013.01); *F02D 19/027* (2013.01); *F02M 21/0245* (2013.01)

(58) Field of Classification Search
CPC ............ F02M 21/023; F02M 21/0239; G05D 16/2022; F16K 31/0651
See application file for complete search history.

(56) References Cited

U.S. PATENT DOCUMENTS 10,082,069 B2 * 9/2018 Hosokawa .......... F02B 29/0443
10,196,961 B2 * 2/2019 Takagi ...................... F01P 7/14

FOREIGN PATENT DOCUMENTS

| CN | 103003605 A | 3/2013 |
| CN | 202946263 U | 5/2013 |

(Continued)

OTHER PUBLICATIONS

CN 202946263 U Machine translation of Description and Claims Provided by Dialog Foreign Patent Finder (Year: 2021).*

(Continued)

*Primary Examiner* — Michael A Kessler
(74) *Attorney, Agent, or Firm* — Scully Scott Murphy & Presser

(57) ABSTRACT

The present disclosure relates to a pressure stabilizer, a gas engine system and a gas pressure control method. The pressure stabilizer includes: a housing, which comprises a gas intake chamber and a piston chamber, wherein a spacer is provided between the gas intake chamber and the piston chamber, and the spacer is provided with a spacer through hole; a piston, which is slidably disposed in the piston chamber and which is provided therein with a piston through hole passing through the piston; a spring disposed in the piston chamber, wherein the spring is disposed between the piston and the spacer; a gas outlet end cap, which is disposed at an open end of the piston chamber and which is provided with a gas outlet; and an electromagnetic coil, which is disposed at an end of the gas outlet end cap that is close to the piston, wherein the electromagnetic coil generates a magnetic field force for attracting the piston in an energized state, so as to attract the piston to approach the gas outlet end cap.

10 Claims, 2 Drawing Sheets

(56) References Cited

FOREIGN PATENT DOCUMENTS

| | | | | |
|---|---|---|---|---|
| CN | 104121115 A | 10/2014 | | |
| CN | 204663703 U | 9/2015 | | |
| CN | 205387976 U | 7/2016 | | |
| DE | 102014012722 A1 * | 3/2016 | ......... | F16K 31/0679 |
| JP | 2014-044505 A | 3/2014 | | |

OTHER PUBLICATIONS

CN 205387976 U Machine translation of Description and Claims Provided by Dialog Foreign Patent Finder (Year: 2021).*
DE 102014012722 A1 Machine translation of Description Provided by ESPACENET (Year: 2021).*
CN 104121115 A Machine translation of Description Provided by ESPACENET (Year: 2021).*
First Office Action dated Jan. 10, 2020 received in Chinese Patent Application No. CN 201911152554.2 together with an English language translation.

* cited by examiner

PRESSURE STABILIZER, A GAS ENGINE SYSTEM AND A GAS PRESSURE CONTROL METHOD

TECHNICAL FIELD

The present disclosure belongs to the technical field of gas engines, and specifically relates to a pressure stabilizer, a gas engine system and a gas pressure control method.

BACKGROUND

At present, gas nozzles used in natural gas engines can work well only when a flow speed of internal gas is sound speed. To ensure that the flow speed of gas in the gas nozzle is sound speed, it is necessary to ensure that a ratio of gas pressure at a nozzle outlet and gas pressure at a nozzle inlet is smaller than a fixed value (typically 0.54).

In the natural gas engine system, the inlet of the gas nozzle is connected to a pressure stabilizer, and the outlet of the gas nozzle is connected to an intake pipe through a mixer. The pressure stabilizer is configured to stabilize the gas pressure at a certain value. The working principle of the existing pressure stabilizer is: high-pressure gas enters the pressure stabilizer, and enters a conduit in the middle of a piston through a circulation gap between the piston and a gasket, wherein an isostatic chamber communicates with the gas outlet, a gas pressure in the isostatic chamber is equal to the pressure at an outlet of the stabilizer, and the isobaric chamber functions to make the pressure at the gas outlet act on a top face of the piston. At this point, the pressure on the top face of the piston forms a dynamic balance with a spring and a pressure of a vacuum chamber, so that the pressure at the gas outlet is equal to a set value.

However, the existing pressure stabilizers have the following disadvantages: there is friction between the piston and a housing, so that when the piston moves in a direction toward the outlet of the pressure stabilizer, the gas pressure at the outlet of the pressure stabilizer will decrease. In addition, when the piston moves in the direction toward the outlet of the pressure stabilizer, the spring is in an extended state, an elastic force of the spring will be attenuated, which will also cause the gas pressure at the outlet of the pressure stabilizer to decrease. The decrease of the gas pressure at the outlet of the pressure stabilizer will cause the pressure at the inlet of the nozzle to decrease, and the ratio of the gas pressure at the nozzle outlet to the gas pressure at the nozzle inlet may be larger than the fixed value of 0.54, making it impossible to meet the engine demand under some operating conditions of the gas nozzle.

SUMMARY

An object the present disclosure is to at least solve the problem that the gas pressure at the outlet of the pressure stabilizer may decrease when the piston moves in the direction toward the outlet of the pressure stabilizer in existing pressure stabilizers. This object is achieved through the following technical solutions.

In a first aspect of the present disclosure, a pressure stabilizer is provided, which includes: a housing which includes a gas intake chamber and a piston chamber, wherein a spacer is provided between the gas intake chamber and the piston chamber, and the spacer is provided with a spacer through hole; a piston, which is slidably disposed in the piston chamber and which is provided therein with a piston through hole passing through the piston; a spring disposed in the piston chamber, wherein the spring is disposed between the piston and the spacer; a gas outlet end cap, which is disposed at an open end of the piston chamber and which is provided with a gas outlet; an electromagnetic coil, which is disposed at an end of the gas outlet end cap that is close to the piston, wherein the electromagnetic coil generates a magnetic field force for attracting the piston in an energized state, so as to attract the piston to approach the gas outlet end cap.

In the pressure stabilizer according to the embodiment of the present disclosure, an electromagnetic coil is disposed at an end of the gas outlet end cap that is close to the piston, and the electromagnetic coil generates a magnetic field force for attracting the piston in an energized state, so as to attract the piston to approach the gas outlet end cap. Therefore, the magnetic field force of the electromagnetic coil can be used to control a displacement amount of the movement of the piston toward the gas outlet end cap, thereby increasing the gas pressure at the gas outlet of the pressure stabilizer.

In some embodiments of the present disclosure, the electromagnetic coil is disposed in a circumferential direction of the gas outlet end cap.

In some embodiments of the present disclosure, the pressure stabilizer further includes a blocking cap installed in the gas intake chamber, and a plurality of blocking cap through holes are provided in the blocking cap.

In some embodiments of the present disclosure, the gas outlet end cap is connected with the open end of the piston chamber by a thread.

In some embodiments of the present disclosure, a gas pressure balance hole is provided in the housing at the piston chamber.

In some embodiments of the present disclosure, the pressure stabilizer further includes a gas inlet end cap, a gas inlet is provided on the gas inlet end cap, and the gas inlet communicates with the blocking cap through holes.

In some embodiments of the present disclosure, the piston includes a piston head and a piston rod, the piston head is in sliding and sealing fit with the piston chamber, the piston rod is inserted into the spacer through hole, and the spring is sleeved over the piston rod.

In some embodiments of the present disclosure, an end of the piston head that abuts against the gas outlet end cap is provided with an adjustment chamber, the adjustment chamber is in communication with the piston through hole, and a diameter of the adjustment chamber is larger than a diameter of the piston through hole.

In a second aspect of the present disclosure, a gas engine system is provided, which includes: a gas intake pipe, which is configured to supply gas to a gas engine; a mixer, an outlet of which is connected to the gas intake pipe; a gas nozzle, an outlet of which is connected to a gas inlet of the mixer; a pressure stabilizer, which is the pressure stabilizer in any of the above embodiments, wherein a gas outlet of the pressure stabilizer is connected to an inlet of the gas nozzle; a first pressure sensor, which is disposed between the pressure stabilizer and the gas nozzle; a second pressure sensor, which is disposed between the gas intake pipe and the mixer; and an ECU, which is electrically connected to the first pressure sensor, the second pressure sensor, and an electromagnetic coil of the pressure stabilizer.

In a third aspect of the present disclosure, a gas pressure control method is provided, which is applied to the gas engine system in any of the above embodiments, and the gas pressure control method includes:

obtaining a first pressure value of the first pressure sensor in real time;

obtaining a second pressure value of the second pressure sensor in real time;

calculating a ratio of the second pressure value to the first pressure value; and controlling a magnetic field force of the electromagnetic coil to increase, according to a result that the ratio is larger than or equal to a preset value.

BRIEF DESCRIPTION OF THE DRAWINGS

Upon reading a detailed description of the preferred embodiments below, various other advantages and benefits will become clear to those skilled in the art. The drawings are only for the purpose of illustrating the preferred embodiments, and should not be considered as limiting the present disclosure. Moreover, identical parts are denoted by identical reference signs throughout the drawings.

DETAILED DESCRIPTION

Figure 1:
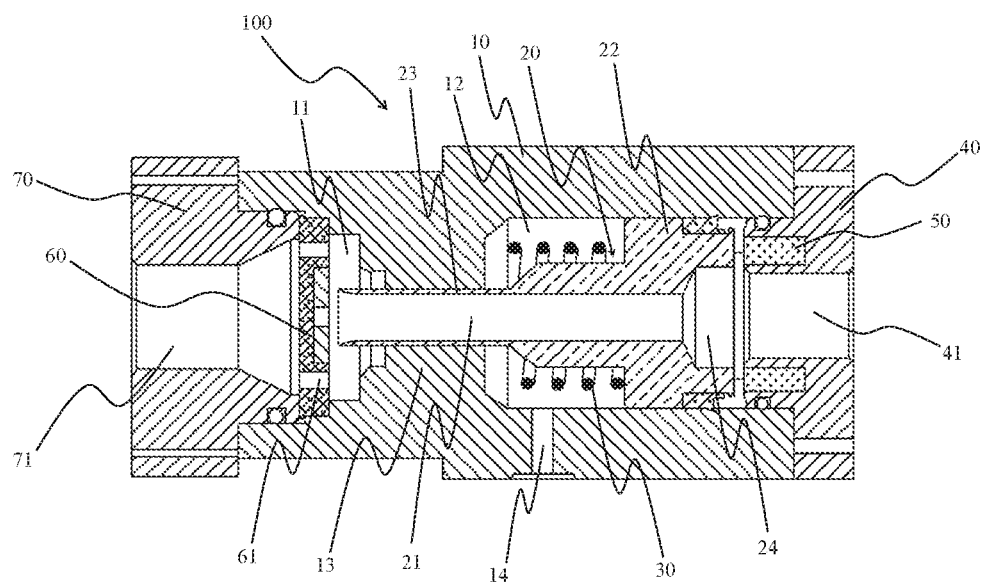
FIG. 1 is a schematic structural view of a pressure stabilizer according to an embodiment of the present disclosure.
Figure 2:
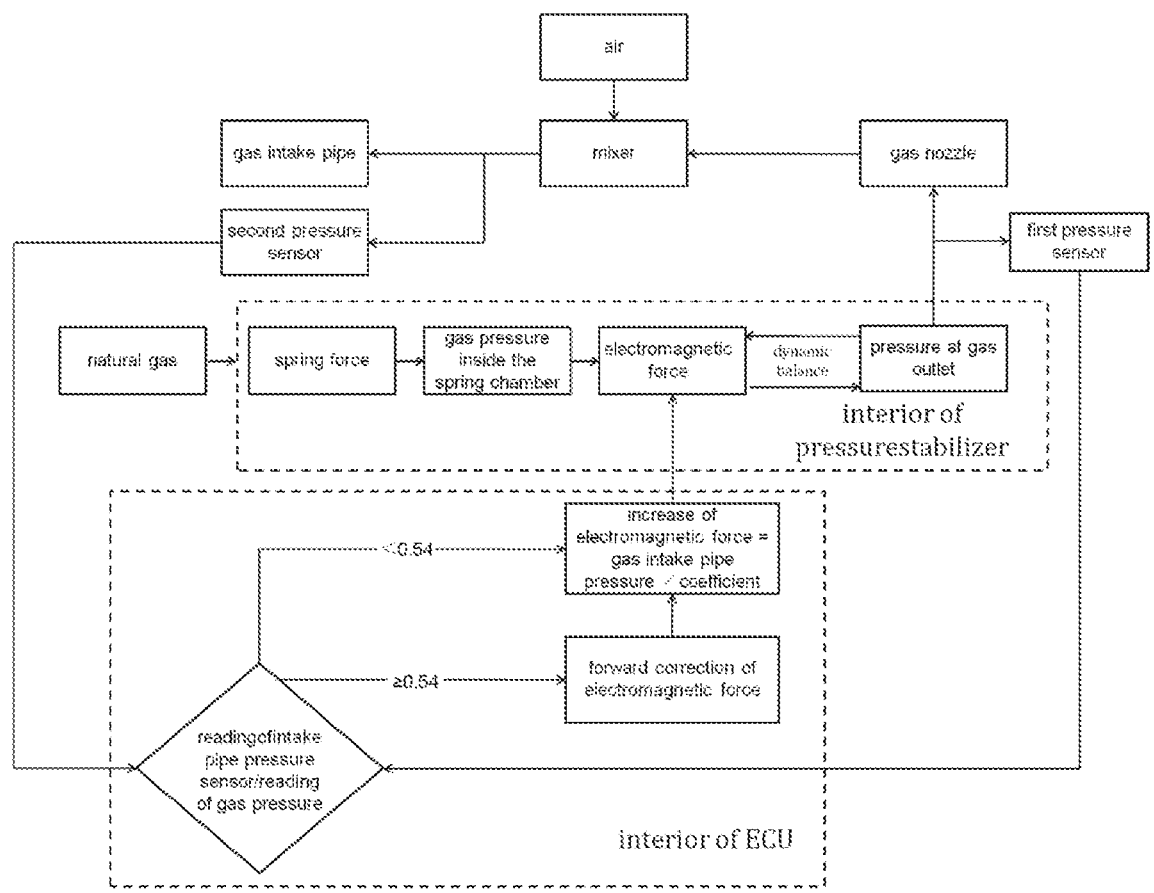
FIG. 2 is a schematic view of a gas engine system according to an embodiment of the present disclosure.

Hereinafter, exemplary embodiments of the present disclosure will be described in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limiting. Unless clearly indicated otherwise in the context, the singular forms "a", "an" and "said" as used herein may also mean that the plural forms are included. The terms "include", "including", "contain" and "have" are inclusive, and therefore indicate the existence of the stated features, steps, operations, elements and/or components, but do not exclude the existence or addition of one or more other features, steps, operations, elements, components and/or combinations thereof.

Although the terms "first", "second", "third", etc. may be used herein to describe a plurality of elements, components, regions, layers and/or sections, these elements, components, regions, layers and/or sections should not be limited by these terms. These terms may only be used to distinguish one element, component, region, layer or section from another region, layer or section. Unless clearly indicated otherwise in the context, terms such as "first", "second" and other numerical terms as used herein do not imply an order or sequence. Therefore, the first element, component, region, layer or section discussed below may be referred to as a second element, component, region, layer or section without departing from the teachings of the exemplary embodiments.

For ease of description, the terms of spatial relative relationship may be used herein to describe the relationship of one element or feature relative to another element or feature as shown in the drawings. These terms of relative relationship are, for example, "inner", "outer", "inside", "outside", "below", "under", "over", "above", etc. These terms of spatial relative relationship are intended to include different orientations of the device in use or in operation in addition to the orientation depicted in the drawings. For example, if the device in the figure is inverted, then an element described as "under another element or feature" or "below another element or feature" will then be oriented as "above another element or feature" or "over another element or feature". Therefore, the exemplary term "below" may include orientations of both "above" and "below". The device may be otherwise oriented (rotated by 90 degrees or in other directions) and the descriptors of spatial relative relationship as used herein are explained accordingly.

An embodiment of a first aspect of the present disclosure proposes a pressure stabilizer 100, which includes a housing 10, a piston 20, a spring 30, a gas outlet end cap 40, and an electromagnetic coil 50. Specifically, the housing 10 includes a gas intake chamber 11 and a piston chamber 12. A spacer 13 is disposed between the gas intake chamber 11 and the piston chamber 12. The spacer 13 is provided with a spacer through hole, and the piston 20 is slidably disposed in the piston chamber 12. A piston through hole 21 penetrating the piston 20 is provided in the piston 20, the spring 30 is provided in the piston chamber 12, and the spring 30 is disposed between the piston 20 and the spacer 13. The gas outlet end cap 40 is disposed at an open end of the piston chamber 12, and the gas outlet end cap 40 is provided with a gas outlet 41. The electromagnetic coil 50 is disposed at an end of the gas outlet end cap 40 that is close to the piston 20. The electromagnetic coil 50 generates a magnetic field force for attracting the piston 20 in an energized state, so as to attract the piston 20 to approach the gas outlet end cap 40.

In the pressure stabilizer 100 according to the embodiment of the present disclosure, an electromagnetic coil 50 is disposed at an end of the gas outlet end cap 40 that is close to the piston 20, and the electromagnetic coil 50 generates a magnetic field force for attracting the piston 20 in an energized state, so as to attract the piston 20 to approach the gas outlet end cap 40. Therefore, the magnetic field force of the electromagnetic coil 50 can be used to control a displacement amount of the movement of the piston 20 toward the gas outlet end cap 40, thereby increasing the gas pressure at the gas outlet of the pressure stabilizer 100.

Specifically, the electromagnetic coil 50 is disposed in a circumferential direction of the gas outlet end cap 40. The electromagnetic coil 50 may be a plurality of electromagnetic coils disposed in the circumferential direction of the gas outlet end cap 40, or one full-turn electromagnetic coil disposed in the circumferential direction of the gas outlet end cap 40, as long as an electromagnetic force that attracts the piston 20 in the energized state can be provided.

In addition, a sealing ring for sealing is provided between the housing 10 and the gas outlet end cap 40.

Further, the pressure stabilizer 100 further includes a blocking cap 60 installed in the gas intake chamber 11, and a plurality of blocking cap through holes 61 are provided in the blocking cap 60. The gas can be injected into the gas intake chamber 11 through the blocking cap through holes 61, and further enter the piston through hole 21.

Further, the gas outlet end cap 40 is connected with the open end of the piston chamber 12 by a thread, and the position of the gas outlet end cap 40 can be adjusted by the degree of screwing of the gas outlet end cap 40 and the piston chamber 12, so that a distance between the piston 20 and the blocking cap 60 can be adjusted to achieve the purpose of pressure regulation.

Further, a gas pressure balance hole 14 is provided in the housing 10 at the piston chamber 12. When the pressure stabilizer 100 is applied to a gas engine system, the gas pressure balance hole may be connected to a gas intake pipe.

Further, the pressure stabilizer 100 further includes a gas inlet end cap 70, in which a gas inlet 71 is provided, and the gas inlet 71 communicates with the blocking cap through holes 61.

In addition, a sealing ring for sealing is provided between the housing 10 and the gas inlet end cap 70.

Further, the piston 20 includes a piston head 22 and a piston rod 23, the piston head 22 is in sliding and sealing fit with the piston chamber 12, the piston rod 23 is inserted into the spacer through hole, and the spring 30 is sleeved over the piston rod 23.

Further, an end of the piston head 22 that abuts against the gas outlet end cap 40 is provided with an adjustment chamber 24, and the adjustment chamber 24 is in communication with the piston through hole 21. A diameter of the adjustment chamber 24 is larger than a diameter of the piston through hole 21, and the adjustment chamber 24 is configured to adjust a pressure balance between the gas inlet end and the gas outlet end.

An embodiment of a second aspect of the present disclosure proposes a gas engine system, which includes a gas intake pipe, a mixer, a pressure stabilizer 100, a gas nozzle, a first pressure sensor, a second pressure sensor, and an ECU. Specifically, the gas intake pipe is configured to supply gas to a gas engine, an outlet of the mixer is connected to the gas intake pipe, an outlet of the gas nozzle is connected to a gas inlet of the mixer, and the pressure stabilizer 100 is the pressure stabilizer in any of the above embodiments. The gas outlet 41 of the pressure stabilizer 100 is connected to an inlet of the gas nozzle, the first pressure sensor is disposed between the pressure stabilizer 100 and the gas nozzle, and the second pressure sensor is disposed between the gas intake pipe and the mixer. The ECU is electrically connected to the first pressure sensor, the second pressure sensor and the electromagnetic coil 50 of the pressure stabilizer 100, and the ECU can control the magnetic field force of the electromagnetic coil 50.

An embodiment of a third aspect of the present disclosure proposes a gas pressure control method, which is applied to the gas engine system in the previous embodiment, and the method includes:

obtaining a first pressure value of the first pressure sensor in real time;

obtaining a second pressure value of the second pressure sensor in real time;

calculating a ratio of the second pressure value to the first pressure value; and controlling a magnetic field force of the electromagnetic coil 50 to increase, according to a result that the ratio is larger than or equal to a preset value;

wherein the preset value may be 0.54; when the ratio of the second pressure value to the first pressure value is >0.54, the magnetic field force of the electromagnetic coil 50 is controlled to increase, thereby increasing the pressure at the inlet of the gas nozzle 400, further ensuring that the ratio of gas pressure at the outlet of the gas nozzle and gas pressure at the inlet of the gas nozzle is smaller than 0.54, and ensuring that the gas in the gas nozzle flows at the speed of sound.

Described above are only specific preferred embodiments of the present disclosure, but the scope of protection of the present disclosure is not limited to this. Any change or replacement that can be easily contemplated by those skilled in the art within the technical scope disclosed in the present disclosure should be covered within the scope of protection of the present disclosure. Therefore, the scope of protection of the present disclosure shall be accorded with the scope of the claims.

The invention claimed is:

1. A pressure stabilizer, comprising:
   a housing, which comprises a gas intake chamber and a piston chamber, wherein a spacer is provided between the gas intake chamber and the piston chamber, and the spacer is provided with a spacer through hole;
   a piston, which is slidably disposed in the piston chamber and which is provided therein with a piston through hole passing through the piston;
   a spring disposed in the piston chamber, wherein the spring is disposed between the piston and the spacer;
   a gas outlet end cap, which is disposed at an open end of the piston chamber and which is provided with a gas outlet; and
   an electromagnetic coil, which is disposed at an end of the gas outlet end cap that is close to the piston, wherein the electromagnetic coil generates a magnetic field force for attracting the piston in an energized state, so as to control a displacement amount of the movement of the piston toward the gas outlet end cap by utilizing the magnetic field force of the electromagnetic coil, to increase the gas pressure at the gas outlet of the pressure stabilizer.

2. The pressure stabilizer according to claim 1, wherein the electromagnetic coil is disposed in a circumferential direction of the gas outlet end cap.

3. The pressure stabilizer according to claim 1, wherein the pressure stabilizer further comprises a blocking cap installed in the gas intake chamber, and a plurality of blocking cap through holes are provided in the blocking cap.

4. The pressure stabilizer according to claim 3, wherein the gas outlet end cap is connected with the open end of the piston chamber by a thread.

5. The pressure stabilizer according to claim 1, wherein a gas pressure balance hole is provided in the housing at the piston chamber.

6. The pressure stabilizer according to claim 3, wherein the pressure stabilizer further comprises a gas inlet end cap, a gas inlet is provided on the gas inlet end cap, and the gas inlet communicates with the blocking cap through holes.

7. The pressure stabilizer according to claim 1, wherein the piston comprises a piston head and a piston rod, the piston head is in sliding and sealing fit with the piston chamber, the piston rod is inserted into the spacer through hole, and the spring is sleeved over the piston rod.

8. The pressure stabilizer according to claim 7, wherein an end of the piston head that abuts against the gas outlet end cap is provided with an adjustment chamber, the adjustment chamber is in communication with the piston through hole, and a diameter of the adjustment chamber is larger than a diameter of the piston through hole.

9. A gas engine system, comprising:
   a gas intake pipe, which is configured to supply gas to a gas engine;
   a mixer, an outlet of which is connected to the gas intake pipe;
   a gas nozzle, an outlet of which is connected to a gas inlet of the mixer;
   a pressure stabilizer, which is the pressure stabilizer according to claim 1, wherein a gas outlet of the pressure stabilizer is connected to an inlet of the gas nozzle;
   a first pressure sensor, which is disposed between the pressure stabilizer and the gas nozzle;

a second pressure sensor, which is disposed between the gas intake pipe and the mixer; and an ECU, which is electrically connected to the first pressure sensor, the second pressure sensor, and an electromagnetic coil of the pressure stabilizer.

10. A gas pressure control method, which is applied to the gas engine system according to claim 9, the gas pressure control method comprising:

obtaining a first pressure value of the first pressure sensor in real time;

obtaining a second pressure value of the second pressure sensor in real time;

calculating a ratio of the second pressure value to the first pressure value; and controlling a magnetic field force of the electromagnetic coil to increase, according to a result that the ratio is larger than or equal to a preset value.

\* \* \* \* \*